Oct. 2, 1951      P. McK. DEELEY      2,569,925
TERMINAL BLOCK FOR ELECTROLYTIC CAPACITORS
Filed Dec. 30, 1948      3 Sheets-Sheet 1
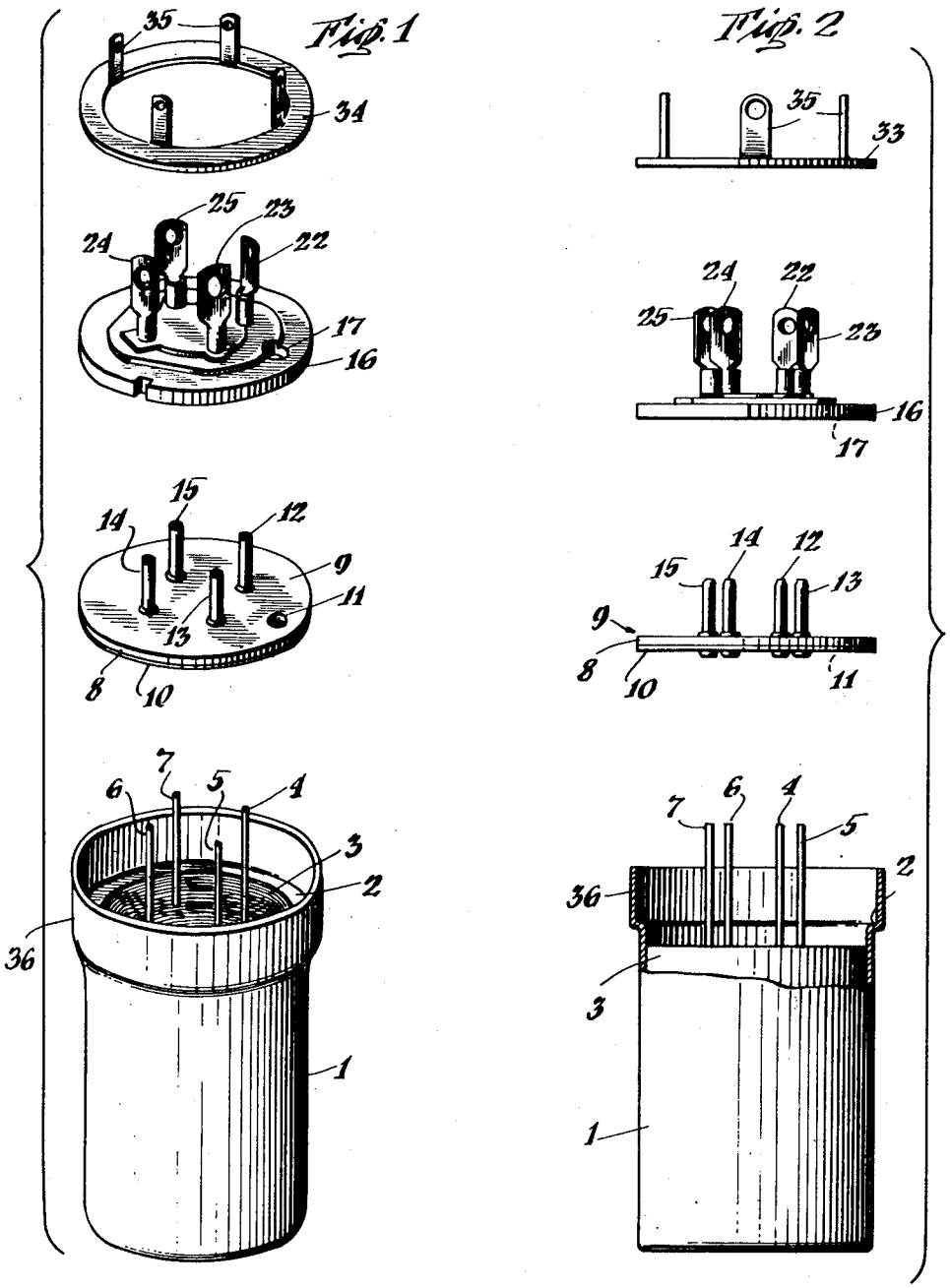
INVENTOR
Paul McKnight Deeley
BY
ATTORNEY

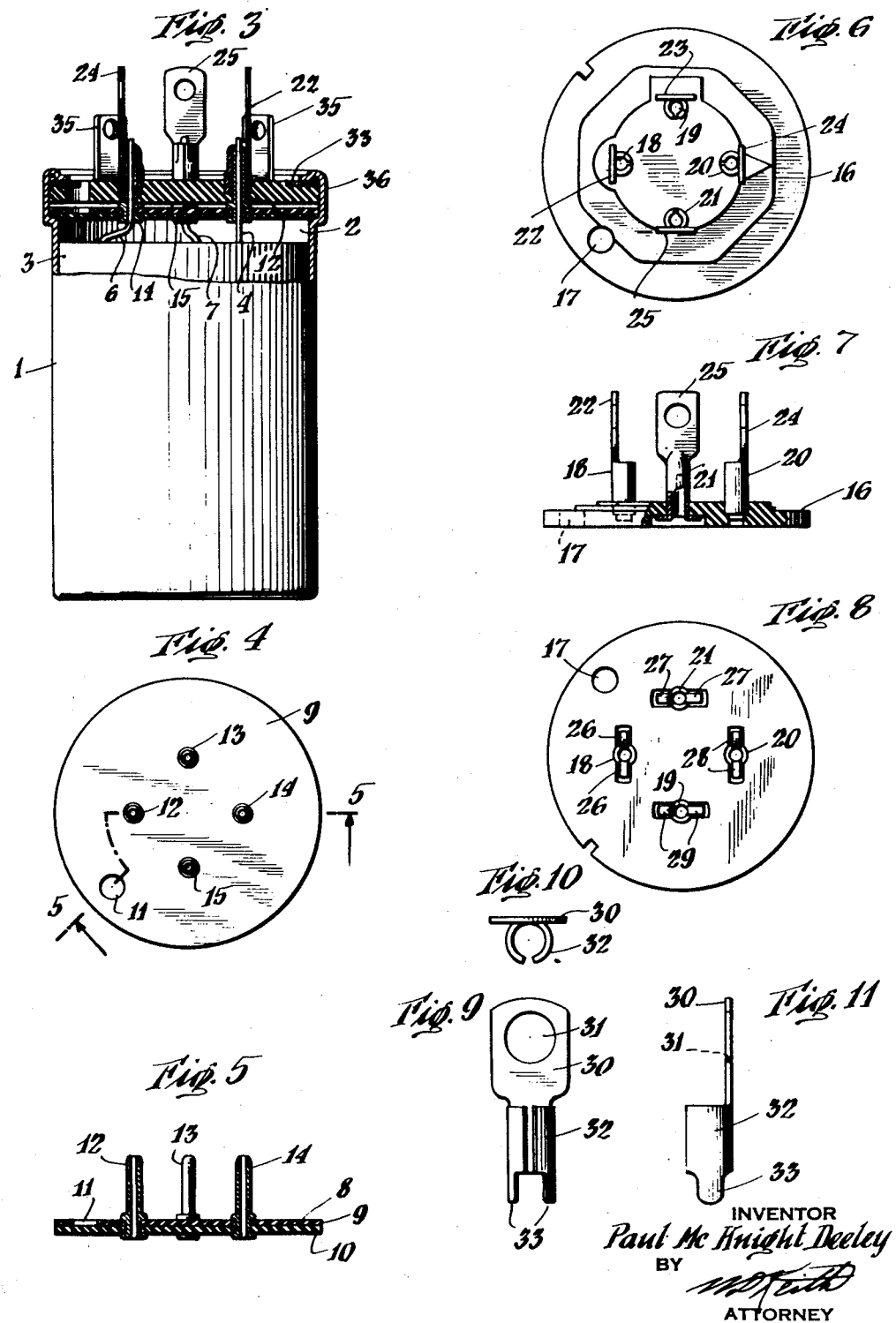

Oct. 2, 1951    P. McK. DEELEY    2,569,925
TERMINAL BLOCK FOR ELECTROLYTIC CAPACITORS
Filed Dec. 30, 1948    3 Sheets-Sheet 3
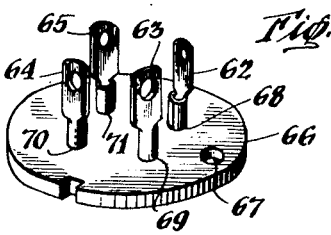
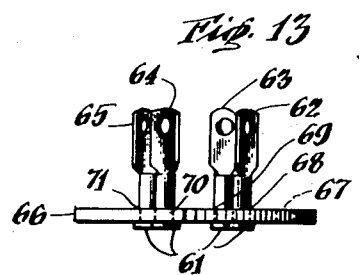
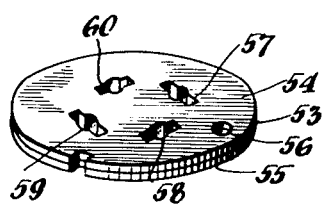
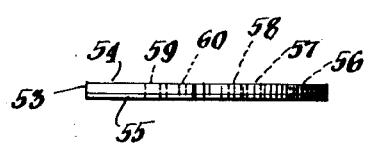
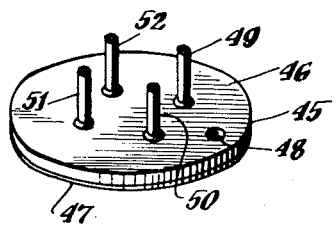
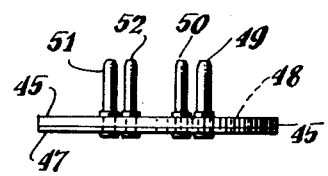
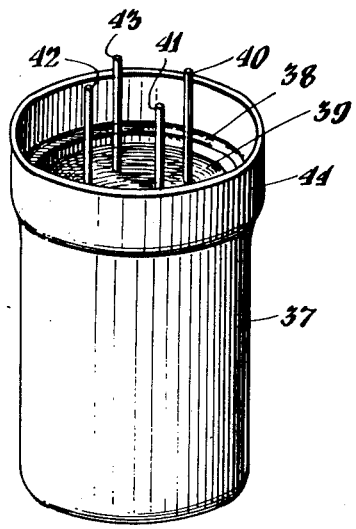
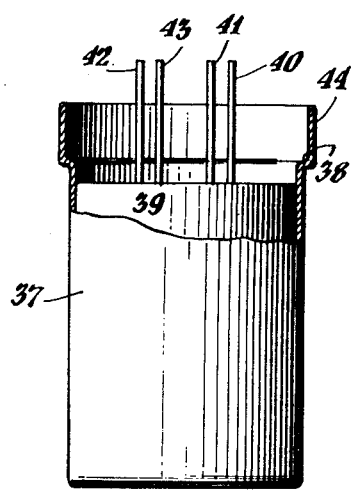
INVENTOR.
Paul McKnight Deeley
BY
ATTORNEY Patented Oct. 2, 1951

2,569,925

UNITED STATES PATENT OFFICE 2,569,925

TERMINAL BLOCK FOR ELECTROLYTIC CAPACITORS

Paul McKnight Deeley, North Plainfield, N. J., assignor to Cornell-Dubilier Electric Corporation, South Plainfield, N. J., a corporation of Delaware Application December 30, 1948, Serial No. 68,369

3 Claims. (Cl. 175—315)

This invention relates to a terminal assembly for electrical devices and particularly to an improved terminal assembly for capacitors. It is desirable in the manufacture of capacitors and other electrical apparatus to provide a terminal assembly which hermetically seals the container and has sufficient mechanical strength to preserve the hermetic seal when the device is subject to severe mechanical stress through rough usage. In addition, it is also desirable to attain these ends with a construction adapted to rapid, simple and inexpensive manufacturing operations.

Some existing terminal assemblies initially provide a satisfactory hermetic seal, usually of small surface area, which is often limited in effective life by reason of the gradual deterioration of the materials utilized in the seal and, likewise, often suffers stress failure under conditions of rough handling. Most present commercial terminal assemblies are of such construction as to preclude their fabrication by rapid and simple manufacturing operations. An object of this invention is to provide a novel and improved terminal construction that will assure a continually satisfactory hermetic seal of a large effective surface area.

Another object of this invention is to provide a novel and improved terminal assembly of great mechanical strength and superior resistance to failure under rough handling and usage.

A further object of the invention is a terminal assembly which may be constructed by rapid, simple and inexpensive manufacturing operations.

The improved terminal assembly proposed by the invention is particularly well adapted for the construction of dry electrolytic capacitors. The invention may be employed with equal advantage in any capacitor or similar electrical assembly presenting similar problems of sealing or of terminal construction.

Referring to the drawings:

Fig. 1 is an exploded perspective view of the invention embodied in its preferred form as a terminal assembly in a capacitor;

Fig. 2 is a side view of the parts shown in Fig. 1;

Fig. 3 is a side view, partially in section, of the invention embodied in its preferred form as a terminal assembly in a capacitor;

Fig. 4 is a top view of a sealing cap;

Fig. 5 is a side view of the sealing cap on the line 5—5 of Fig. 4;

Fig. 6 is a top view of a terminal block;

Fig. 7 is a side view, partially in section, of the terminal block shown in Fig. 6;

Fig. 8 is a bottom view of the terminal block shown in Fig. 6;

Fig. 9 is a front view of a terminal lug;

Fig. 10 is a top view of the lug shown in Fig. 9;

Fig. 11 is a side view of the lug shown in Fig. 9;

Fig. 12 is an exploded perspective view of an alternative embodiment of the invention in its preferred form as a terminal assembly in a capacitor; and Fig. 13 is a side view of the parts shown in Fig. 12.

The invention may be described briefly as an improved terminal assembly of successive laminae providing an increased surface contact area for the formation of the hermetic seal, and having an improved terminal lug construction to insure a continual hermetic seal despite rough handling and usage.

Figs. 1 and 2 show a conventional cylindrical condenser can, or container 1, made of aluminum or other suitable material, closed at one end and having an annular internal shoulder 2 at the other end thereof. A flange 36 extends upwardly from said shoulder. The open end of the can 1, as defined by the flange 36, has a greater internal diameter than the main cylindrical portion of the can. The can may contain any conventional capacitor unit, generally indicated as 3, and the can is sized to contain the desired unit 3 in such position that the upper end of said unit 3 is at the level of, or somewhat below, the shoulder 2. Terminal leads, of suitable number, such as 4, 5, 6, 7 are connected to the electrode elements in the capacitor unit and are of sufficient length as to extend upwardly past the mouth of the container.

As indicated by the number of terminals shown in the drawing, a dual capacitor unit 3 is used in the embodiment of the invention illustrated in the drawings; however, the invention may be practiced with a single or multiple capacitor unit and the terminal leads may be attached at either or both ends of said unit.

A sealing cap 8, illustrated in detail in Figs. 4 and 5, of substantially the same diameter as the flange 36 of can 1, is disposed to rest on and be supported by the shoulder 2. This sealing cap 8 is a composite unit comprising a relatively rigid, wafer-like disc 9, composed of an insulating medium such as Bakelite, or like material having suitable mechanical strength and insulating qualities, and a similarly shaped and sized disc 10, composed of a soft deformable insulating medium such as unvulcanized, partially vulcanized or vulcanized rubber, firmly bonded, as by adhesive to the disc 9. The Bakelite disc 9 contains an opening 11 near its periphery but this opening 11 does not have a matching counterpart in the disc 10 and is therefore sealed by the disc 10.

The composite sealing cap 8 has riveted thereon flanged tubes such as 12, 13, 14, 15 corresponding in number to the terminal leads above identified, constructed of aluminum or other suitable conducting material. These tubes are so mounted that the riveted section is in contact with the rubber disc 10 and the extended portions of said tubes 12, 13, 14, 15 proceed through and extend upwardly from the Bakelite disc 9.

A terminal block 16, illustrated in detail in Figs. 6, 7 and 8, of substantially the same diameter as the open end of the container 1 and the composite sealing cap 8, is disposed to be mounted on the sealing cap 8. The annular terminal block 16 is a preferably molded, relatively thick, cylindrical section of Bakelite or other suitable insulating medium of good mechanical strength. In the block 16 is provided an opening 17, of a diameter equal to that of the opening 11 in the composite annular cap 8 and disposed to coincide with the opening 11 in the composite cap 8 upon assembly of the cap and the block. In addition the terminal block 16 contains four spaced openings 18, 19, 20, 21 adapted to receive terminal lugs 22, 23, 24, 25, which lugs are sized to receive and contain the tubes 12, 13, 14, 15 mounted on the composite sealing cap 8. Recesses 26, 27, 28, 29 are provided on the bottom of the terminal block 16, adjacent to the openings 18, 19, 20, 21 (as shown in Figs. 7 and 8), to receive the ears 33 on the terminal lugs 22, 23, 24, 25, so as to prevent the rotation of said lugs and likewise insure a flush fit of the bottom surface of block 16 against the Bakelite surface 9 of the composite sealing cap 8.

The preferred form of the terminal lugs 22, 23, 24, 25 is illustrated in Figs. 9, 10 and 11. Each consists of a shaped sheet of solderable material comprising a roughly rectangular, flat, upper segment 30, a mounting aperture 31 embedded therein, and a lower segment 32 terminating in mounting ears 33 sized to fit into recesses 26, 27, 28 and 29 on the underside of the terminal block 16.

The terminal lugs 22, 23, 24, 25 are mounted in the terminal block 16 (see Fig. 7) so that the lower segment 32 is contained within and extends beyond the openings 18, 19, 20, 21, the ears 33 being bent into recesses 26, 27, 28, 29.

Referring now to Figs. 1, 2 and 3, the assembling of the complete terminal assembly comprises placing the composite sealing cap 8 on the shoulder 2 of the container 1 so that the disc 10 of soft deformable material contacts the horizontal surface of said shoulder 2. The terminal leads 4, 5, 6, 7 pass through the respective tubes 12, 13, 14, 15. The placing of the disc 10 of soft deformable material in contact with the flat surface of the shoulder 2 assures a large area of contact between the disc 10 of soft deformable material and the shoulder 2 of the container 1.

The terminal block 16 is then placed on top of the composite sealing cap 8 so that the opening 17 coincides with the opening 11 in the sealing cap 8 and so that the metal tubes 12, 13, 14, 15 containing the terminal leads 4, 5, 6, 7 are contained firmly within the lower segments of the terminal lugs 22, 23, 24, 25 mounted on terminal block 16.

A circular metal mounting ring may, if desired, be placed on top of the terminal block 16 and, if mounting lugs are desired to hold the completed assembly in operative position, these may be furnished as shown at 35 as a part of the mounting ring 34.

After the various elements have been assembled in their proper order, pressure is applied to hold the sealing elements firmly against the shoulder 2 and the top edge of the can 1 is spun over the upper surface of the terminal block 16, or if the metal mounting ring 34 is utilized, over said ring 34.

The pressure applied to the assembly causes the soft deformable material on the disc 10 to expand against the sides of the container 1. The disc 10 thus contacts the horizontal surface of the shoulder 2 of the can 1 and the pressure applied assures a secure seal on this surface. The disc 10, in expanding under the applied pressure, also contacts the inner surface of the container flange 36 and forms a sealing relationship therewith. Thus disc 10 contacts a large portion, if not all, of the area of shoulder 2 and, in addition, an area of the flange 36.

Such a construction has definite advantages over the usual terminal assembly in which the soft deformable material is placed between two layers of relatively rigid material with the consequent result that, after the application of pressure, the soft deformable material only expands radially outward, to solely contact the side of the container and to form a seal of relatively small surface area. The construction of this invention provides the soft deformable sealing material in direct contact with a large horizontal surface, the area of the shoulder 2, and a vertical surface, thus providing a seal of large surface contact, said seal being formed on two contiguous inner surfaces of the capacitor container, said surfaces being angularly disposed to each other.

In Figs. 12 and 13 there is illustrated an alternative embodiment of the invention. There is shown a condenser can 37 containing a capacitor unit 39 having terminal leads, of suitable number, such as 40, 41, 42, 43 connected to the electrode elements therein and extending upwardly past the mouth of the container. The can 37, identical in construction with the can 1 shown in Figs. 1 and 2, is closed at one end and has an annular internal shoulder 38 at the other end thereof. The open end of the can 37, as defined by a flange 44 extending upwardly from the shoulder 38, has a greater internal diameter than the main cylindrical portion of the can.

A composite sealing cap 45, of substantially the same diameter as the flange 44 of the can 37, is disposed to rest on and be supported by the shoulder 38. This cap 45, identical in construction with the composite cap 8 shown in Figs. 1, 2, 4 and 5, is a composite unit comprising a relatively rigid, wafer-like disc 46, composed of an insulating medium such as Bakelite, or like material having suitable mechanical strength and insulating qualities, and a similarly shaped and sized disc 47, composed of a soft insulating medium such as unvulcanized, partially vulcanized or vulcanized rubber, firmly bonded, as by adhesive, to the disc 46. The Bakelite disc 46 has an opening 48 near its periphery but this opening 48 does not have a matching counterpart in the disc 47 and is therefore sealed by the disc 47.

The composite cap 45 has riveted thereon flanged tubes, such as 49, 50, 51, 52 corresponding in number to the terminal leads above identified, constructed of aluminum or other suitable conducting material. These tubes are so mounted that the riveted section is in contact with the rubber disc 47 and the extended portions of said tubes 49, 50, 51, 52 proceed through and extend upwardly from the Bakelite disc 46.

An intermediate sealing cap 53 of substantially the same diameter as the flange 44 on the condenser can 37 is disposed to rest upon and be supported by the sealing cap 45. This intermediate sealing cap 53 is also a composite unit comprising a relatively rigid, wafer-like disc 54, composed of an insulating medium such as Bakelite, or like material having suitable mechanical strength and insulating qualities, and a similarly shaped and sized disc 55, composed of a soft deformable insulating medium such as unvulcanized, partially vulcanized, or vulcanized rubber, firmly bonded, as by adhesive to the disc 54.

In this intermediate sealing cap 53 there is provided an opening 56, of a diameter equal to that of the opening 48 in the composite sealing cap 45 and disposed to coincide with said opening 48 upon assembly of the two sealing caps.

In addition, the intermediate sealing cap contains four spaced openings 57, 58, 59, 60 to receive, upon assembly, the flanged tubes 49, 50, 51, 52, mounted on the composite sealing cap 45, and to provide for securing the mounting ears 61 of the terminal lugs 62, 63, 64, 65, similar in construction to those described in detail in Figs. 9, 10, 11, to prevent rotation or displacement of the lugs and to assure a flush fit of the various members upon assembly.

A terminal block 66, of substantially the same diameter as the open end of the can 37, is disposed to be mounted on the sealing cap 53. The terminal block is a relatively thick, cylindrical section of Bakelite or other suitable insulating medium of good mechanical strength. In the block 66 there is provided an opening 67, of a diameter equal to that of the opening 56 in the intermediate sealing cap 53 and disposed to coincide with said opening 56 upon assembly of the block and cap. In addition, the terminal block 66 contains four spaced openings 68, 69, 70, 71 adapted to receive terminal lugs 62, 63, 64, 65, which lugs are sized to receive and contain the tubes 49, 50, 51, 52 mounted on the composite sealing cap 45.

A metal mounting ring, having mounting lugs thereon similar to that shown in Figs. 1 and 2 may be used if desired.

The assembling of the complete terminal assembly comprises placing the composite sealing cap 45 on the shoulder 38 of the container 37 so that the disc 47 of deformable material contacts the horizontal surface of the shoulder 38. The terminal leads 40, 41, 42, 43 pass through the respective tubes 49, 50, 51, 52.

The intermediate sealing cap 53 is then placed on top of the composite sealing cap 45 so that the opening 56 coincides with the opening 48 in the composite cap 45 and so that the deformable disc 55 rests upon the Bakelite disc 46 of the composite sealing cap 45.

The terminal block 66 is then placed on top of the Bakelite disc 54 on the cap 53 so that the opening 67 coincides with the opening 56 on the cap 53, and so that the metal tubes 49, 50, 51, 52 containing the terminal leads 40, 41, 42, 43 are contained firmly within the lower segments of the terminal lugs 62, 63, 64, 65 mounted on the terminal block 66.

A circular metal mounting ring of the type shown in Figs. 1 and 2, may, if desired, be placed on top of the terminal block 66.

After the various elements have been assembled in their proper order, pressure is applied to hold the sealing elements firmly against the shoulder 38, and the top edge of the container 37 is spun over the upper surface of the terminal block 66, or, if a metal mounting ring, as shown in Figs. 1 and 2, is utilized, over said ring.

The terminal assembly described in Figs. 12 and 13 has the advantages of the embodiment described in Figs. 1 and 2 and in addition, provides an increase in the effective sealing surface in that the intermediate deformable disc, i. e. the deformable disc 55 on the intermediate sealing cap 53 is deformed radially outward by the applied pressure, into contact with the sides of the flange 44 to provide an additional secure seal upon this surface.

Some types of capacitors require a vent arrangement to provide for the release of gases formed inside the container. To accomplish this desired venting arrangement, in the embodiment of the invention illustrated in Figs. 1 and 2, the opening 11 in the composite sealing cap 8 and the opening 17 in the terminal block 16, which are aligned in the assembled device, are provided. The disc 10 of soft deformable material does not contain any opening and consequently terminates the passageway formed by the aligned openings 11, 17. This soft deformable disc 10 may be pierced with a pinpoint providing an aperture that will normally remain closed, due to the deformable characteristics of the material, preserving the hermetic seal, but will open and release any substantial resultant pressure formed by any gases generated within the unit. A similar construction is employed in the alternative embodiment of the invention illustrated in Figs. 12 and 13.

In an assembled terminal assembly, as shown in Fig. 3, the terminal leads 4, 5, 6, 7 are contained within and extend beyond the cylindrical tubes 12, 13, 14, 15 which in turn are contained within the lower segments of the terminal lugs 22, 23, 24, 25. In order to insure a good electrical contact and a complete hermetic seal, the terminal sub-assembly of the terminal lead, each corresponding tube, and terminal lug are crimped and squeezed together into a liquid tight engagement. Thereafter, if desired, the thus engaged tubes and lugs may be soldered or welded together to insure an improved electrical contact and hermetic seal.

By applying the principles of this invention, as above described, it is possible to construct seals of great mechanical strength and thus eliminate a breakage of the hermetic seal, or of the terminals passing therethrough, when the capacitor is subjected to mechanical stress occasioned by rough handling.

The various elements making up the terminal assembly may be assembled in a sub-assembly operation and the assembled terminal assembly is then mounted in a condenser can in a single operation, thus greatly simplifying assembling operations.

The invention described above through its novel and improved construction of the various laminae and terminal connections provides a greatly improved terminal assembly overcoming the deficiencies existing in many available terminal assemblies. The simplicity of construction and assemblage readily lends itself to rapid, simple and efficient manufacturing operations.

Having thus described my invention, I claim:

1. A capacitor, comprising, a container open at one end, a seal receiving abutment extending around the periphery of the inner wall of the container adjacent the open end, said container being sized to provide a capacitor unit receiving space defined at its open end by said abutment, a capacitor unit contained within said container having terminal leads extending past said abutment, a first sealing element composed of a soft deformable lamina bonded to a stiff relatively undeformable lamina, said first sealing element shaped to be received by the open end of the container and being positioned therein with said deformable lamina in contact with said abutment, tubular metallic sleeves sized to closely encompass said terminal leads mounted on said first sealing element for permitting passage therethrough of said terminal leads, each of said sleeve members being mounted substantially flush with said deformable lamina and extending a substantial distance past said relatively undeformable lamina, a second sealing element composed of a soft deformable lamina bonded to a stiff relatively undeformable lamina shaped to be received by the open end of the container and being positioned therein with the deformable lamina positioned adjacent the relatively undeformable lamina of the first sealing element, passage means extending through said second sealing element having positioning recesses adjacent thereto, a pressure block having terminal receiving passages extending therethrough shaped to be received by the open end of said container and being disposed therein in contact with the relatively undeformable lamina of the second sealing element, terminal lugs having a cylindrical body portion sized to closely encompass said sleeves contained within said terminal receiving passages, each of said terminal lugs having positioning ears adjacent said cylindrical body portions thereof and disposed within said recesses in said second sealing element, and means for maintaining said block in compressive engagement with said second sealing element.

2. A capacitor, comprising a container open at one end, a seal receiving abutment extending around the periphery of the inner wall of the container adjacent the open end thereof, said container being sized to provide a capacitor unit receiving space defined at its open end by said abutment, a capacitor unit contained within said container having terminal leads extending outwardly thereof past said abutment, a first sealing element composed of a soft deformable lamina bonded to a stiff relatively undeformable lamina, both said laminae being formed of insulating material, said first sealing element shaped to be received by the open end of the container and being positioned therein with said deformable lamina in contact with said abutment, tubular metallic sleeves sized to closely encompass said terminal leads hermetically mounted on said first sealing element for permitting passage therethrough of said terminal leads upon disposition of said first sealing element upon said abutment, each of said sleeve members being mounted substantially flush with said deformable lamina and extending a substantial distance past said relatively undeformable lamina and being joined to said terminal leads contained therein at the free end thereof, a second sealing element composed of a soft deformable lamina bonded to a stiff relatively undeformable lamina shaped to be received by the open end of the container and being positioned therein with the deformable lamina positioned adjacent the relatively undeformable lamina of said first sealing element, passage means sized to closely encompass said metallic sleeves extending through said second sealing element and having a plurality of terminal lug positioning recesses in the undeformable lamina disposed adjacent thereto, a pressure block of substantially greater thickness than that of said first and second sealing elements having terminal receiving passages extending therethrough and shaped to be received by the open end of said container and being disposed therein in contact with the relatively undeformable lamina of the second sealing element, terminal lugs having a cylindrical body portion of a length substantially equal to the thickness of said pressure block and sized to closely encompass said sleeves contained within said terminal receiving passages, each of said terminal lugs having positioning ears adjacent said cylindrical body portions thereof and disposed within said positioning recesses in said second sealing element, said terminal lugs being joined to said terminal lead containing sleeves at the sealed ends thereof, and means for maintaining said pressure block in compressive engagement with said second sealing element.

3. A capacitor, comprising, a container open at one end, a seal receiving abutment extending around the periphery of the inner wall of the container adjacent the open end thereof, said container being sized to provide a capacitor unit receiving space defined at its open end by said abutment, a capactor unit contained within said container having terminal leads extending outwardly past said abutment, a sealing element composed of a soft deformable lamina bonded to a stiff relatively undeformable lamina, said laminae being made of insulating material, said sealing element shaped to be received by the open end of the container with the deformable lamina in contact with said abutment, tubular metallic sleeve members sized to closely encompass said terminal leads hermetically mounted on said sealing element for permitting passage therethrough of said terminal leads upon disposition of said sealing element upon said abutment, each of said sleeve members being mounted substantially flush with said deformable lamina and extending a substantial distance past said relatively undeformable lamina and being joined to said enclosed terminal leads at the free end thereof, a relatively undeformable pressure block of substantially greater thickness than that of said sealing element having terminal receiving passages extending therethrough and shaped to be received by the open end of said container and positioned therein in contact with said relatively undeformable lamina, a plurality of terminal lug positioning recesses disposed adjacent the ends of said terminal receiving passages in the surface of said pressure block adjacent said relatively undeformable lamina, terminal lugs having cylindrical body portions of a length substantially equal to the thickness of said pressure block and sized to closely encompass said terminal lead containing sleeve members contained within said terminal receiving passages, each of said terminal lugs having positioning ears disposed adjacent the body portion thereof and positioned within said positioning recesses, said terminal lugs being joined to said terminal lead containing sleeve members at the free ends thereof, and means for maintaining said pressure block in compressive engagement with said relatively undeformable lamina.

PAUL McKNIGHT DEELEY.

REFERENCES CITED

The following references are of record in the file of this patent:

UNITED STATES PATENTS

| Number | Name | Date |
|---|---|---|
| 2,144,959 | Blackburn | Jan. 24, 1939 |
| 2,183,091 | Claassen | Dec. 12, 1939 |
| 2,187,950 | Nulsen et al. | Jan. 23, 1940 |
| 2,202,166 | Peck | May 28, 1940 |
| 2,225,801 | Schnoll | Dec. 24, 1940 |
| 2,246,933 | Deeley | June 24, 1941 |
| 2,343,675 | Kenyon | Mar. 7, 1944 |
| 2,464,022 | Carpenter | Mar. 8, 1949 |